United States Patent [19]
May

[11] Patent Number: 6,080,972
[45] Date of Patent: Jun. 27, 2000

[54] REMOTELY OPERATED UNIVERSAL PROGRAMMABLE OVEN CONTROLLER

[76] Inventor: Leonhard May, 10757 Akins Rd., North Royalton, Ohio 44133

[21] Appl. No.: 09/122,985

[22] Filed: Jul. 27, 1998

Related U.S. Application Data

[63] Continuation-in-part of application No. 08/873,320, Jun. 11, 1997, Pat. No. 5,786,568, which is a continuation-in-part of application No. 08/391,412, Feb. 16, 1995, Pat. No. 5,653,905.

[51] Int. Cl.[7] ........................................... H05B 1/02
[52] U.S. Cl. ........................ 219/494; 219/714; 219/506; 219/486; 340/870.17; 99/325
[58] Field of Search ..................... 219/506, 497, 219/494, 486, 714; 340/870.16, 870.17, 825.37, 825.31, 825.36; 99/331, 325, 332, 333

[56] References Cited

U.S. PATENT DOCUMENTS

| | | | |
|---|---|---|---|
| 4,837,414 | 6/1989 | Edamula | 219/714 |
| 5,147,068 | 9/1992 | Wright | 221/9 |
| 5,710,409 | 1/1998 | Schwarzbacker et al. | 219/506 |
| 5,746,114 | 5/1998 | Harris | 99/331 |
| 5,818,428 | 10/1998 | Eisenbrandt et al. | 345/173 |
| 5,841,112 | 11/1998 | Brooks et al. | 219/506 |

*Primary Examiner*—Mark Paschall
*Attorney, Agent, or Firm*—Joseph H. Taddeo

[57] ABSTRACT

An apparatus is disclosed for automatically programming and controlling an oven, such as a food oven. The oven and its controller can be remotely operated over great distances by using a personal computer having a modem, and transmitting and receiving bidirectionally over a telephone interconnection, to display the cooking progress, modify a cooking sequence or prepare a new program sequence. An ergonomically designed operating panel provides an interactive intuitive method of programming the desired cooking sequences. Switch selections are monitored by a microprocessor which branches to the various preprogrammed functions. In addition, self-analysis and self-diagnostics aid the user in displaying a walk-back of the stored times and temperatures that occurred during an operating cycle before a power outage. A novel integrated oven design conserves the floor space and exhaust fan floor installation and operating costs.

18 Claims, 4 Drawing Sheets

REMOTELY OPERATED UNIVERSAL PROGRAMMABLE OVEN CONTROLLER

REFERENCE TO PREVIOUSLY FILED APPLICATIONS

This applications is a continuation-in-part of Utility patent application Ser. No. 08/873,320, filed Jun. 11, 1997, issued for A PROGRAMMABLE OVEN FOR COOKING, HOLDING AND PROOFING COMESTIBLES, U.S. Pat. No. 5,786,568 on Jul. 28, 1998; that was a continuation-in-part of the parent Utility patent application Ser. No. 08/391,412, filed Feb. 16, 1995, and issued for ROYALTON NATURAL AIR MOVEMENT SYSTEM, U.S. Pat. No. 5,653,905, on Aug. 5, 1997.

FIELD OF INVENTION

The present invention relates generally to the field of controllers for use with food preparation ovens and more particularly to a universal programmable controller that can be remotely operated; one that can be adapted for use with any existing food preparation oven. The food preparation ovens may be of the type that is used for the roasting or baking, holding at temperature, or proofing of various food items. This novel oven controller provides a means of remotely operating, programming and interrogating the performance of a cooking and holding oven by using a remote operators console. In addition, this novel controller provides automatic operation through a power failure or power outage even if its control means is interrupted in its programmed cycle.

BACKGROUND OF THE INVENTION

Today, restaurants and other food preparers find it to their advantage to be able to cook and prepare foods more efficiently with less operator intervention. By reducing the operator interaction, labor costs are conserved. With increased efficiency, the quality and uniformity of the food preparation process can easily be maintained.

Many food ovens currently in use today are specifically designed to be used as cooking ovens. The cook must periodically monitor the cooking process to determine when to remove the food item from the oven. Upon completion of the cooking process, the cook then manually transfers the food item from the cooking oven to a holding oven where the food item can be maintained at a constant temperature until it is time to serve the meal.

There are several ovens in use that have single heating elements upon which to cook and a single thermostat to set the temperature. The cook must monitor the cooking process to determine when to remove the food item from the cooking oven.

There are several patents that disclose programmable oven controllers and sensing systems.

U.S. Pat. No. 5,296, 683, granted Mar. 12, 1994, to D. Burkett and G. Mercer, discloses a preheating method and apparatus for use in a food oven. The apparatus disclosed preheats the oven to a predetermined set temperature.

U.S. Pat. No. 5,182,439, granted Jan. 26, 1993, to D. Burkett and G. Mercer, describes a method and apparatus for operating a food oven that includes a base heating element and quartz bulbs. The cooking cycle is comprised of brown, cook and finish intervals. The duration that the quartz lamps are activated is dependent on at least one of three factors; the oven air temperature, the load compensation factor, and a base temperature set point.

U.S. Pat. No. 5,154,940, granted Oct. 13, 1992, to W. J. Budzyna, et al, discloses a method and apparatus for rapidly heating or cooking a food product. The oven apparatus is comprised of a closed-loop heated air system that includes a programmed central processing unit (CPU) to control the oven's overall operation. Various sensors comprise the system, such as a door switch, assorted temperature transducers, an air flow switch, and a product-in switch.

U.S. Pat. No. 5,111,028, granted May 5, 1992, to D. Lee, et al, details a method and control arrangement for cooking appliances. The disclosed system is responsive to the selection and placement of the food to be cooked. In another disclosed feature, the system control is responsive to the selected food item, number of rack positions, and the rate of energy released from the energy sources for optimum cooking.

U.S. Pat. No. 4,837,414, granted Jun. 6, 1989, to K. Edamula, discloses an electronically controlled oven comprised of a main body and a remote controller which is separate from the main body. A scanner is used to scan a code representing a recipe and transmitting the code via a wireless signal, such as by infrared radiation. The main body is comprised of a controller and oven; the controller having a computer to output the heater control signals and a memory for storing the cooking programs and recipes; the oven having a cooking chamber and heaters as well as a heater control device.

U.S. Pat. No. 4,626,662, granted Dec. 2, 1986, to S. R. Woolf, discloses a programmable multifunction feedback cooking apparatus that senses the temperature of a food substance or liquid within a cooking vessel. A temperature transducer producing an analog signal is digitized and subsequently fed into a computer which automatically adjusts the amount of heat energy that is applied by a heat source to the cooking food substance. A remote control feature programs the cooking apparatus from a remote location, using a telephone.

None of the above referenced prior art provides for the true remote operation of a universal food preparation oven using bidirectional communication at an extended distance. One of the prior art uses infrared radiation as the communication link between the remote and the oven controller. Infrared radiation communication is generally limited to a line-of-sight application, having no obstruction in between. Another provides remote program entry using serial audio signals that are fed into the receiver of a telephone. Further, in these systems, there exists no provision for monitoring and correcting, if necessary, the cooking process or the preprogrammed sequence and/or recipe.

Therefore, it can be concluded that there exists a continuing need for a universal programmable cooking oven controller, one that can be remotely programmed to operate unattended and one that can be remotely operated to monitor and/or modify an existing programmed schedule. In addition, the universal programmable cooking oven controller is one that can be remotely interrogated to determine the cooking progress. In this regard, this invention fulfills this need.

SUMMARY OF THE INVENTION

The present invention in its preferred embodiment relates to an improved universal programmable oven controller that can be programmed to operate unattended in real-time and with its front panel can perform several self-analyzing functions. In addition, it relates to an improved programmable oven controller, one that can provide remote operation of an existing food preparation oven. The remote operation provides multifunctional capability where one can remotely (1) monitor the current cooking progress while the controller is using a preprogammed cooking sequence, (2) modify the current preprogrammed cooking sequence, (3) create a new programmed sequence, (4) hold, stop or restart the cooking cycle, (5) delete a current operating sequence, (6) replace a current sequence or (7) initiate the newly created replacement sequence.

A Universal Oven Controller having Local Operating and Programming Capability

The three modes of operation are provided: cooking, holding at temperature, or proofing. A novel power management system stores into memory any power outages, their duration, along with the various internal cabinet temperatures. If a sustained power failure occurs, a beeping audible alarm sounds with a flashing front panel indicator that shows a power supply fault had occurred.

A preprogrammed microprocessor controls and monitors the selected cooking sequences. The operating sequences are interactively introduced into the computer's memory through the activation of the front panel controls or via the remote programming console. Several front panel indicators display the mode selected, along with the desired set temperature. In addition, the present temperature achieved, the time to start each mode, the duration at each mode, as well as the current status, are displayed. Closed loop control allows the controller to maintain the desired set temperature for the period entered into the front panel.

An alternate cooking mode is with the use of a probe inserted into the food item. In this mode of operation, a temperature probe is inserted into the frozen food product to sense the internal temperature of the food item. A controlled ambient air temperature thaws the food product. When the internal temperature of the food product reaches 45 degrees, the thawing cycle is considered complete, causing the cooking cycle to start.

There may be times when in the process of preparing and cooking food items that an intermittent power interruption or long term power outage occurs. If there is a power glitch or even a spike on the power line, the microprocessor reverts to a battery backup to preserve the contents of memory. Upon restoration of the power service, the program returns to the same mode of control as it was when the failure occurred and then resumes operation. A lithium battery provides the backup power source for the microprocessor and memory. It is sized so that it can provide a 5 year service life without need of replacement. Transient surge protection is provided at each input to suppress any extraneous noise, especially from power line surges and spikes.

If a long term sustained power outage happens, the cooking cycle may be interrupted which could manifest itself as an undercooked food item. Without an indicator that shows the cook that a power loss occurred, the operator has no particular insight that the food item may have to be cooked longer or perhaps even discarded should the outage be of a prolonged sustained nature.

For each occurrence of either a power failure or interruption, the time of failure and its duration are automatically stored in memory. By interrogating the front panel, the operator can display on demand either the time of failure or the duration of the outage.

In the event a power failure lasts less than 10 minutes, upon the restoration of power, the oven continues its operation at the point in its program where the power failure occurred. This is possible because of the insulation used in the construction of the oven chamber; there is minimal loss of heat within a 10 minute interval.

Should the duration of the power failure be greater than 10 minutes, an audible alarm that emits a beeping sound as well as an illuminated flashing panel light alerts the operator that a failure had occurred. When the power is off, depressing the reset button once will turn off the beeping sound and flashing light. When the power is on, the reset button must be depressed twice.

The self-analyzing feature of the present invention allows the user to explore the stored times and temperatures attained just at the instant of power outage and at the instant of power resumption. There are times when there may be multiple power interruptions, perhaps due to a tree limb falling across the wires. The present invention allocates sufficient memory to store these variables for later operator revue.

A Universal Oven Controller having Remote Operating and Programming Capability

The present invention relates to an improved programmable oven controller, one that can provide remote operation of an existing food preparation oven. The remote operation provides multifunctional capability where one can (1) monitor the current cooking progress while the controller is using a preprogammed cooking sequence, (2) modify the current preprogrammed cooking sequence, (3) create a new programmed sequence, (4) hold, stop or restart the cooking cycle, (5) delete a current operating sequence, (6) replace a current sequence or (7) initiate the newly created replacement sequence.

Remote operation finds application in cases where the operator is separated from the place of business and his present location. There may be an occasion where the operator forgets to modify the current program before leaving his place of business at the end of the day. By simply using a home personal computer, he is able to link up via cellular telephone or telephone land lines and by using prepared software make the necessary revisions to the program that is resident in the oven controller memory. There may be other circumstances where the operator needs to communicate with the oven controller, such as in the case of injury or illness, or the result of a natural disaster, where the operator becomes separated from his place of business.

The remote operation of the universal programmable controller is easily accomplished by using a modem port that is connected to the microprocessor found in the remote operators console. By transmitting and receiving over cell phone or conventional telephone lines, remote operation can easily be obtained over a substantially great distance. It also provides for a bidirectional interface via a telephone line to a remote location for the remote operation of a food oven.

It is therefore an object of the present invention to provide a universal programmable oven controller that when integrated with a cooking oven can be programmed to perform one of the following three operations: (1) to cook or roast the food item, (2) to hold the food item at temperature until it is time to serve or (3) to bake or proof the food item.

It is another object of the present invention to provide a universal programmable oven controller that renders an orderly shut-down sequence resulting from a power failure or power interruption.

It is still another object of the present invention to provide a universal programmable oven controller that renders an orderly reinitialization sequence upon recovery from a power failure or power interruption.

It is still yet another object of the present invention to provide a universal programmable oven controller that is fully protected from power line spikes and line transients.

A further object of the present invention is to provide a universal programmable oven controller that retains the time and duration of a power interruption, as well as recording the temperature at the time of interruption and the temperature at the time that power is resumed.

A still further object of the present invention is to provide a universal programmable oven controller that features an ergonomically designed front panel that is neither intimidating to the user, but intuitively guides the operator through the programming sequence.

Yet another object of the present invention is to provide a universal programmable oven controller that is designed to be self-analyzing in the event of a power outage.

An additional object of the present invention is to provide a universal programmable oven controller that can be remotely operated via a modem and telephone line.

Still yet, an additional object of the present invention is to provide a universal programmable oven controller that can be remotely interrogate, modify an existing program schedule or create a new program sequence by using a modem in a personal computer via a congenital telephone connection.

A still added object of the present invention is to provide a universal programmable oven controller that can be remotely interrogated in a conversational manner via a modem in a personal computer and telephone connection.

Lastly, it is another object of this invention to provide for a universal programmable oven that operates in real time.

Further advantages will become apparent to those of ordinary skill in the art upon reading and understanding the following detailed description.

DETAILED DESCRIPTION OF THE PREFERRED EMBODIMENT

The universal programmable oven system consists of a well insulated oven that uses a microprocessor based control board to control the current flowing into a bank heating elements; either a bank of Calrod heating elements or a bank of quartz lamps. The amount of heat flowing into the oven chamber is determined by the amount of current flowing through the heating elements. The computer program calculates the required flow of current to produce the desired temperature as determined by the temperature sensors. Temperature control of the oven is established by the two temperature sensors; one that measures the internal air temperature, the other, a thermal probe that is inserted into the product.

Figure 1:
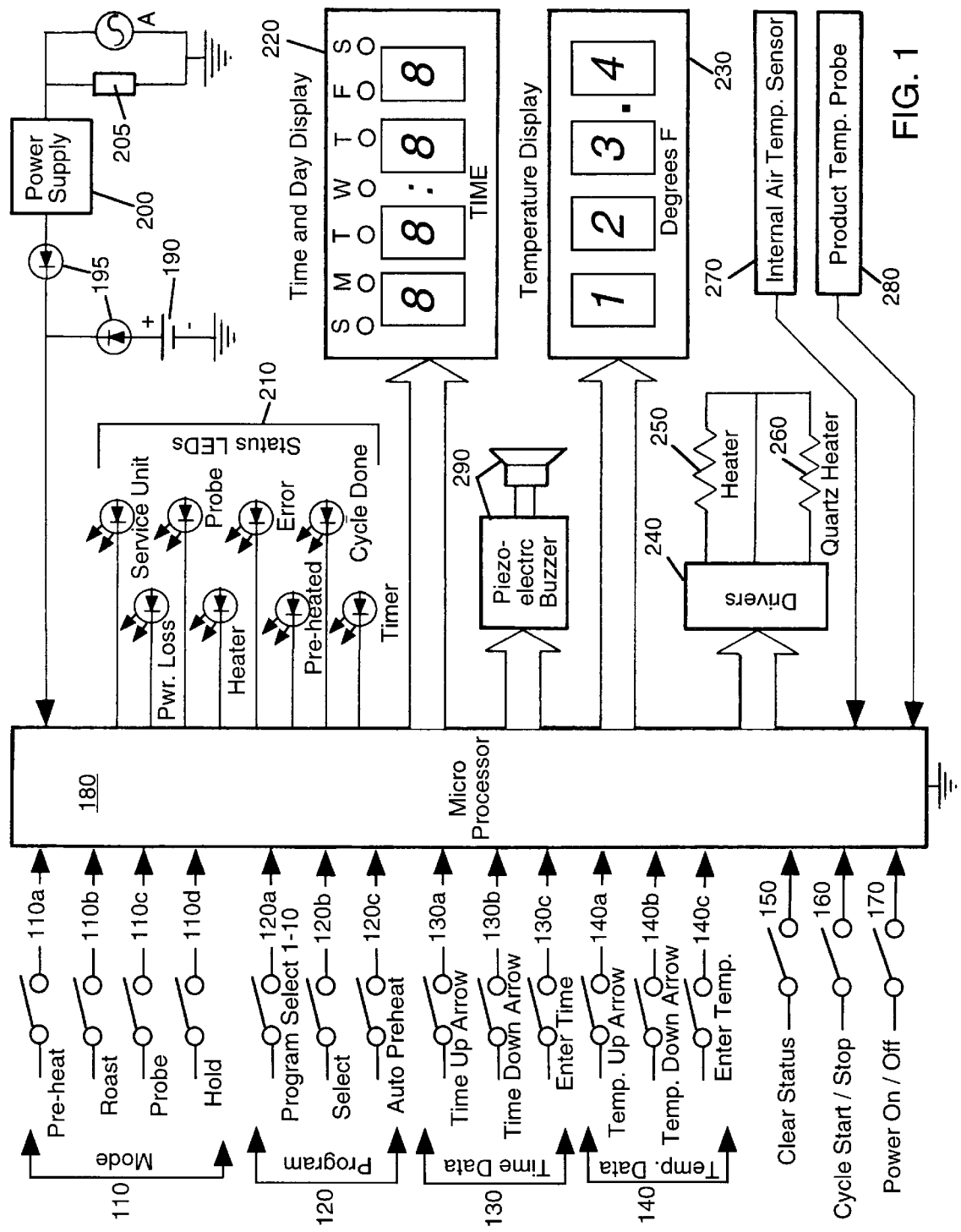
FIG. 1 shows the block diagram of the universal programmable oven in a preferred embodiment of the present invention.

Referring to FIG. 1, shown is the microprocessor 180, which is the heart of the control system, typically, a Motorola MC68705R5S. This microprocessor provides 24 bidirectional I/O lines and 8 unidirectional I/O lines. The internal EEPROM memory stores the program code which executes the code as described herein. An internal 4 channel Analog-to-Digital Converter (ADC) digitizes the temperatures as sensed by the various temperature probes and sensors.

Power for the microprocessor 180 is supplied by either the DC Power Supply or by an internal long-lasting Lithium battery, which provides the battery back-up should there be a power failure. Steering disconnect diodes 195 furnish the isolation between the two sources of power. In typical operation the voltage supplied by the Lithium back-up cell is 3.6 volts, where the normal power supply output voltage is at 5 volts. When the power supply 200 is active and on, diodes 195 effectively block any flow of current from back-up battery 190.

Transient surge voltage protection is provided by Varistor 205 that is connected across the AC source voltage at the input of the DC power supply 200.

Four Mode switches 110 connect to the input of the microprocessor 180 to provide the selection of four operational functions: Preheat, Roast, Probe and Hold. These Mode push-button switches can select operation in either the manual mode or automatic mode. To operate in the automatic mode, the mode switches 110 provide a means of programming the cooking sequence.

The bank of Program Select Switches 120a allows the user to interact with the microprocessor 180 to establish their own program selections that are most frequently used. First, the user selects the program storage area by selecting one of ten available storage selections. Then the user decides if he wishes to select the Auto Preheat function 120c.

After the program sequence is entered into the microprocessor, the user then depresses the Select switch 120b to store the cooking sequence into memory. To make this data entry, the switch must be depressed for at least 3 seconds. Upon the successful completion of the program entry, the microprocessor responds by beeping three times. This method of interaction between the user and microprocessor provides for a user friendly transaction. Thus the stigma that many users have when operating a computer is minimized.

Switch bank 130 permits the user to set or explore the Time information. An Up Arrow push-button 130a and a Down Arrow push-button 130b scroll the data that is stored in memory to present it on the Time Display 220.

The stored Temperatures can be set or explored by the user activating the switches in switch bank 140. Also associated in this switch bank are up and down push-buttons to scroll the Temperature Display 230.

A bank of Status LEDs 210 displays the current status of the oven's activity. What is shown are: "Service Unit, Power Loss, Probe, Heater, Error, Preheat, Cycle Done and Timer." The status is reset by depressing the Clear Status push-button 150.

Auxiliary support switches 160 and 170 furnish additional convenience functions, such as, Cycle Start and Stop push-button 160 and Power On and Off push-button 170.

The oven control is comprised of the control algorithm that is stored in the microprocessor memory. The input sensors are two thermal probes that sense (1) the internal air temperature 270 and (2) the product temperature 280. Each of the temperature sensors is connected to its respective ADC channel. The microprocessor 180 has up to four ADC inputs available.

A set of solid state drivers 240 control the current flowing to the main heater 250 and to the quartz heater array 260. Control is governed by temperature sensed by each sensor that is in control at the time of use. If the temperature that is sensed is too low more current flows into the respective heater in control. Conversely, if the temperature that is sensed is too great, less current flows through the heater in control.

Figure 2:
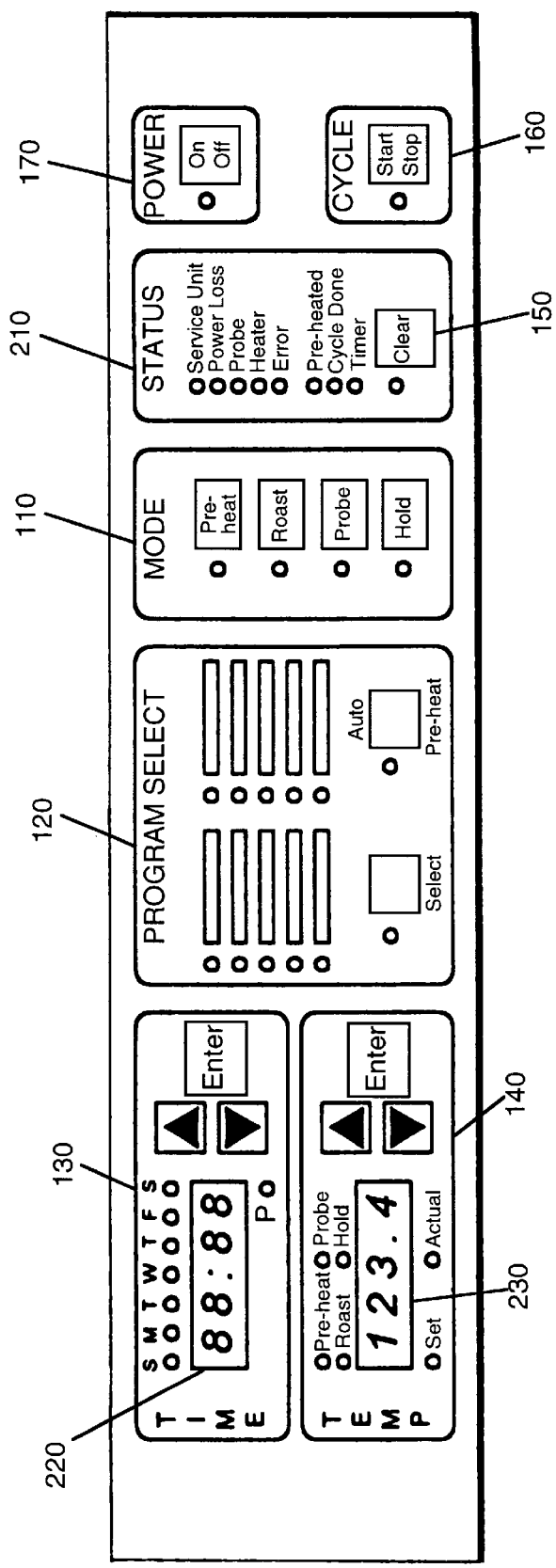
FIG. 2 shows the front panel arrangement of the preferred embodiment of the universal programmable oven.

Turning now to FIG. 2, shown is an ergonomically designed front panel arrangement for the universal programmable oven. Each of the groupings provides an intuitive response from even a novice, such as one who has had little or no experience in operating computerized equipment. The major groupings are: the Power On and Off selection 170, The Cycle Start and Stop selection 160, the Status Indicator LEDs 210, the Mode selectors 210, the Program selectors 120, the Time and Day group 130, and the Temperature group 140.

The Time and Day section of the operators console 130 shows the time that is displayed on the 4 digit LCD time display 220. Located directly above the time display 220 is an array of seven LED lamps that correspond to each day of the week, thereby giving the operator the present day.

In the self-analysis mode of operation the appropriate LED will light showing the day when a particular failure occurred. The use of the Up and Down Arrow push-buttons 130a and 130b will scroll the display showing the various times stored in memory.

The same is also true for the Temperature section 140 of the operators console. Each stored temperature can be displayed on the 4 digit LCD display 230 by scrolling the appropriate Up and Down Arrow keys 140a and 140b. Also located on the front panel are 4 LED mode indicators, of 110, that show which of the four cooking cycles is in progress. These lamps also verify the stored cycles of: Preheat, Roast, Probe and Hold. The two push-buttons directly below the temperature display are the Set and Actual buttons. Depressing the Set button will display the Set Temperature and pushing the Actual button will display the Actual Temperature reading.

Programming Example

Figure 3:
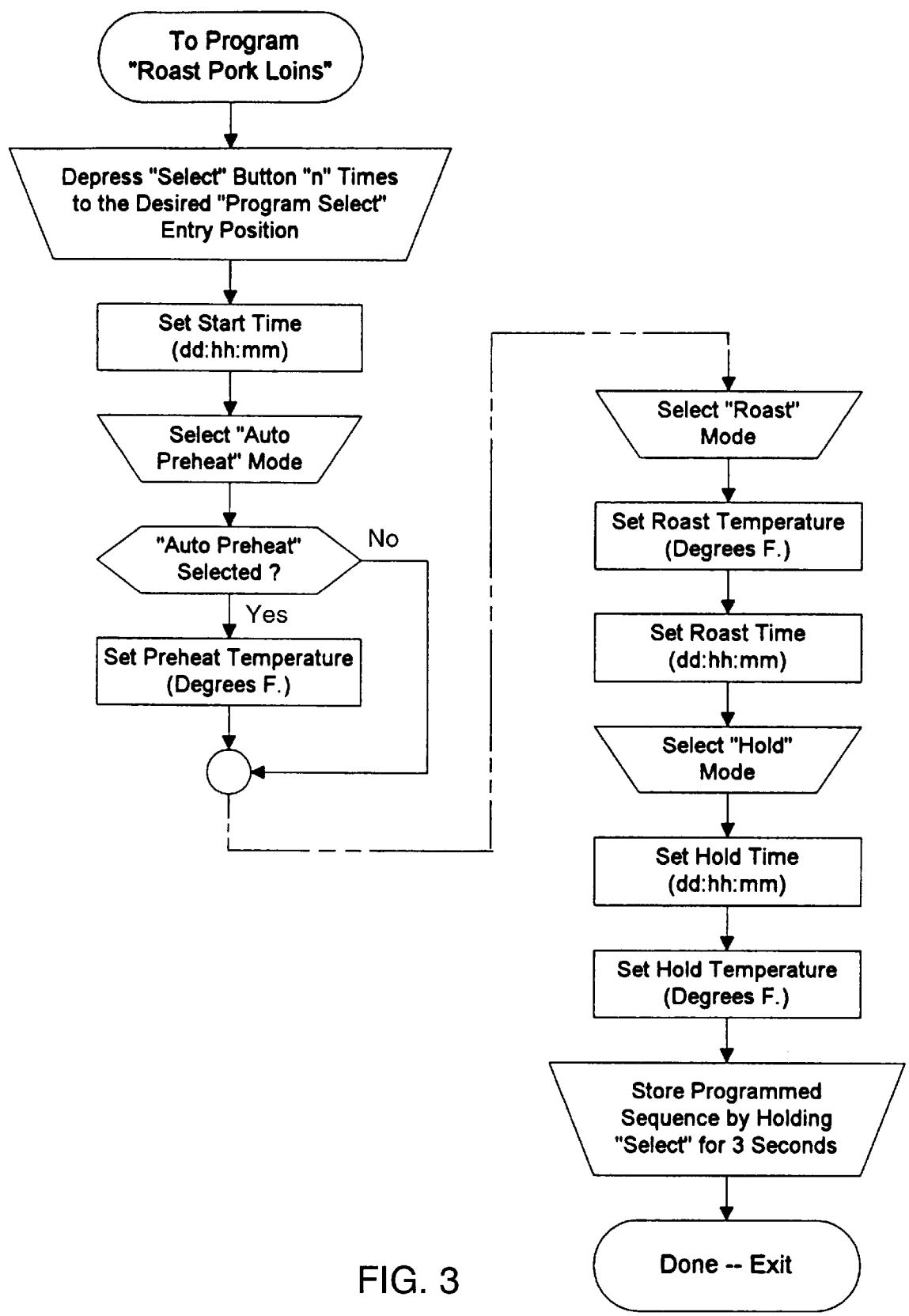
FIG. 3 shows a flow diagram which details an example of the programming function that typifies the user programming interface

Referring to the flowchart shown FIG. 3, an illustrative programming example is given to demonstrate a typical programming sequence that may be used for cooking a Roast Pork Loin. Programming the computer is no longer accomplished by writing many lines of code and entering them into the computer memory. The programming is done by interactively depressing the front panel push-buttons in the desired instruction flow sequence.

To start the programming sequence, the user first depresses the Select push-button "n" times until the desired "Program Select" area is reached. For each push of the Select push-button, the next LED in sequence is illuminated showing the current program area. For convenience the user can write "Pork Loin" on the front panel, identifying the new program.

Next, the user enters the Start Time by scrolling the Time Display 220 with the Up Arrow and Down Arrow push-button switches, 130a and 130b respectively. Depressing the Enter push-button advances the display to the next digit. When the last digit is entered into the display, the program sequence automatically advances to Date display. The date advance with each push of the Enter push-button. When the Time and Date entry is accurate and complete, depressing the Enter push-button for at least 3 seconds will store the data into memory.

The user can then select the "Auto Preheat" mode if so desired. If the "Auto Preheat" function is selected, the user then enters the desired preheat temperature. Entering the temperature is the same data entry process as described in setting the Time and Date, as found in the preceding paragraph.

The Roast function is subsequently selected by depressing push-button 110b. The user now enters the Time and Temperature as was previous described in the preceding paragraphs.

The Hold function is activated by pushing the Hold push-button 110d. The Hold Temperature and the Hold Time can now be entered.

Upon completion of the data entry programming session, the entire program sequence is stored into memory by depressing and holding the Select push-button for at least 3 seconds. A successful data entry is acknowledged by the microprocessor by issuing three consecutive beeps on piezoelectric buzzer 290.

Remote Operators Console

Figure 4:
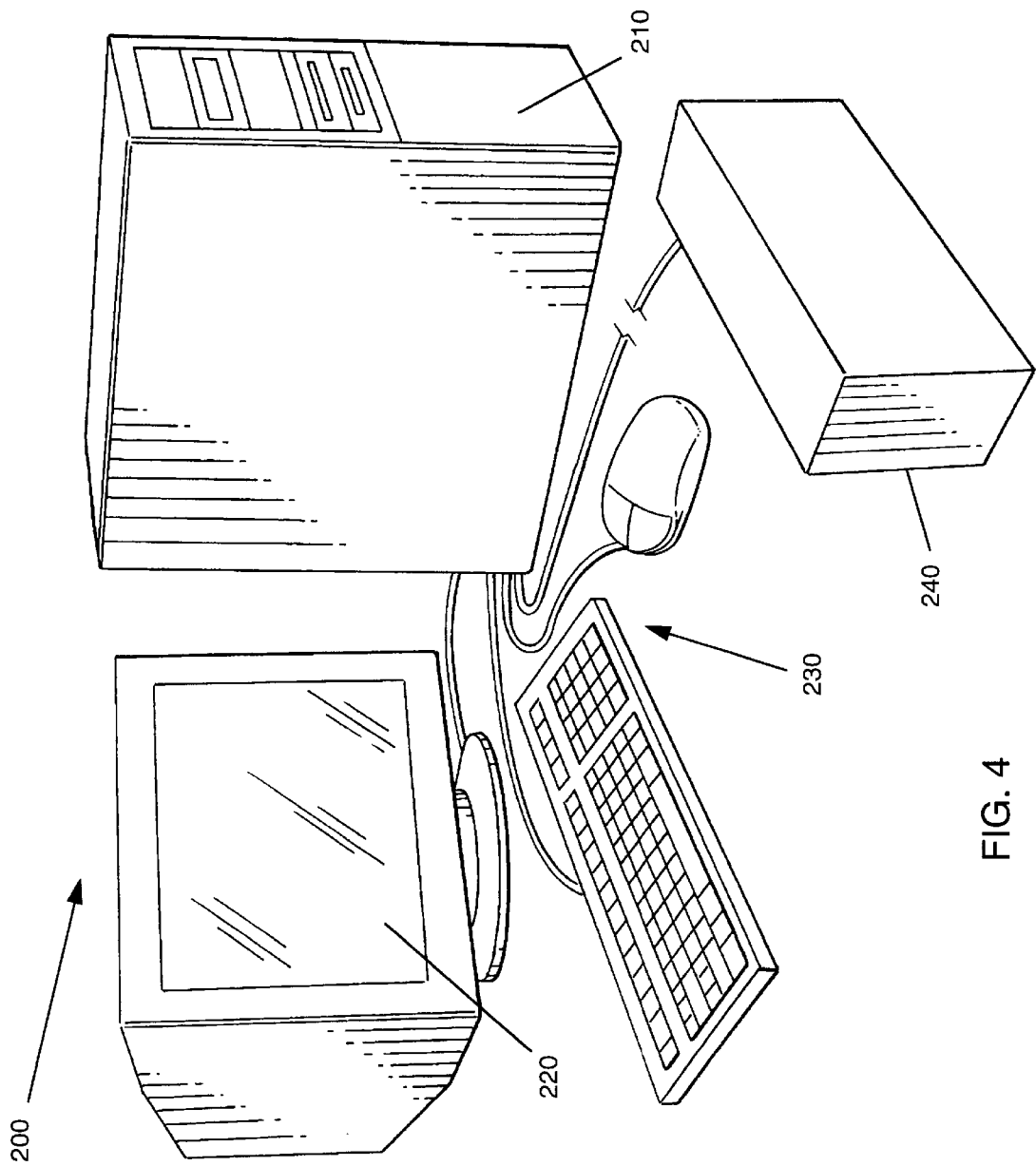
FIG. 4 shows a typical interconnection between the remotely located personal computer and the main oven controller.

With reference to the attached drawing in FIG. 4, there is shown in the preferred embodiment a typical connection between the remotely located personal computer 200 and the main oven controller 240. Typically, the remote personal computer has a computer housing 210, containing the processor, memory and hard drives, a video and sound interface, and a modem for a remote telephone connection, a monitor 220, and a mouse and keyboard 230. The oven controller transaction software is preloaded on the hard drive and is loaded at the time of program execution.

Using the oven controller transaction software, the operator can link up to the oven controller and its associated oven, and be able to remotely perform the following tasks: (1) monitor the current cooking progress while the controller is using a preprogammed cooking sequence, (2) modify the current preprogrammed cooking sequence, (3) create a new programmed sequence, (4) hold, stop or restart the cooking cycle, (5) delete a current operating sequence, (6) replace a current sequence or (7) initiate the newly created replacement sequence.

The operator can also remotely perform the internal diagnostic procedure in the event an error is display while monitoring the cooking progress. Corrections may be made by modifying the current programmed sequence or by remotely resetting the controller.

In an alternative embodiment, a magnetic card reader, such as a card swiping unit can be interfaced to the personal computer to provide a simple means of permanently storing programmed sequences and/or recipes. These cards which resemble the current credit cards in use today can be stored in plastic file boxes or card storage binders for rapid and easy access.

In still another alternative embodiment, a bar-code reader is interfaced to the personal computer to rapidly and accurately enter a particular preprogrammed sequence or recipe In typical operation, a card containing the bar-code numerical sequence is scanned and subsequently sent to the main oven controller. This numerical sequence is identified within the controller, where it then retrieves the corresponding preprogrammed cooking sequence and enters it into the controllers memory, thereby awaiting the time to occur for its execution.

In another alternative embodiment, the remote oven control system can use wireless communication between the remote operators console and the main oven controller. In this embodiment, both the remote operators console and the main oven controller have a transceiver, consisting of a transmitter and receiver. Wireless communication is established using electromagnetic radiation in lieu of a telephone interconnection.

There may be other improvements, modifications and embodiments that will become apparent to one of ordinary skill in the art upon review of this disclosure. As such, these improvements, modifications and embodiments are considered to be within the scope of this invention as defined in the claims and equivalents thereof.

I claim:

1. A universal programmable food oven system, comprising:

an oven with a control board that communicates with a controller, including a microprocessor with a memory and a modem, and an oven temperature control including a first temperature sensor within the oven for measuring an internal oven temperature and a second temperature sensor comprising a thermal probe inserted into a food product within the oven for measuring an internal food product temperature; and, an ADC for digitizing said internal oven and food product temperatures;

first means for programming the oven with a programmed cooking sequence;

second means for self-analyzing for realized compliance with the sequence;

third means for interrogating for intervention with the sequence;

fourth means for modifying the sequence;

fifth means for creating a new cooking sequence;

sixth means for holding, stopping and restarting a cooking cycle;

seventh means for deleting a current cooking sequence;

eighth means for replacing a current cooking sequence and initiating a newly created cooking sequence.

2. A universal programmable oven system according to claim 1, wherein the oven includes a main heater, a quartz heater array and a plurality of solid state drivers to regulate a current flowing to said main heater and quartz heater array; and, wherein the oven temperature control is governed by temperatures sensed by said first and second temperature sensors for input through the microprocessor to the drivers forward of the main heater and the quartz heater array.

3. A universal programmable oven system according to claim 2, wherein the oven and a cooking sequence thereof is controlled from a remote location for instantaneous operation, diagnostic review of operation, programming and reprogramming in real time.

4. The universal programmable oven system according to claim 3, further comprising a means for shutting down the oven system by an orderly shut-down sequence in the event of a power failure, or other untoward event that results in a power interruption.

5. The universal programmable oven system according to claim 4, further comprising a means for reinitializing that renders an orderly reinitialization sequence upon recovery from a power failure or power interruption.

6. The universal programmable oven system according to claim 5, further comprising a means for protecting the controller from power line spikes and line transients.

7. The universal programmable oven system according to claim 6, wherein the second means for self-analyzing further comprises a means for retaining the time and duration of a power interruption, as well as recording the temperature at the time of interruption and the temperature at the time that power is resumed.

8. The universal programmable oven system according to claim 7, further comprising a remote computer having an oven controller software for communication with the oven system, the controller, microprocessor and the oven, to monitor progress of the cooking sequence, modify the sequence, create a new cooking sequence program, hold, stop or restart a cooking cycle, delete a current operating sequence, replace a current sequence, or initiate a newly created cooking sequence.

9. A universal programmable oven system according to claim 8, further comprising a remote operator console in communication with the oven controller for executing programs and cooking sequences to the oven via the remote computer.

10. A universal programmable oven system according to claim 9, wherein the remote operator console and the oven controller include a transceiver with a transmitter and a receiver.

11. The universal programmable oven system according to claim 10, wherein the remote computer is in communication with the oven system via conventional telephone land lines.

12. A universal programmable oven system according to claim 10, wherein the remote computer is in communication with the oven system via cellular telephone connection. programmed cooking sequence stored therein, for transmittal of the stored cooking sequence to the oven controller by swiping the card through the reader.

13. A universal programmable oven system according to claim 10, wherein the remote computer is in communication with the oven system using electromagnetic radiation.

14. A universal programmable oven system according to claim 1, wherein the oven and a cooking sequence thereof is controlled by direct interface with the oven control board for instantaneous operation, diagnostic review of operation, programming and reprogramming in real time.

15. The universal programmable oven system according to claim 14, wherein the oven comprises a one-piece cabinet with three modes of operation for cooking, holding and proofing operations therein.

16. The programmable food oven according to claim 15, wherein the oven includes an audible alarm and a visual alarm concomitant with an external power supply failure to warn an operator of power outages of a sustained duration.

17. The universal programmable oven system of claim 10, wherein the computer includes a magnetic card reader having an associated card with a programmed cooking sequence stored therein, for transmittal of the stored cooking sequence to the oven controller by swiping the card through the reader.

18. The universal programmable food oven system according to claim 10, the computer further comprising a bar-code reader with an associated card having a bar-code numerical cooking sequence, for transmittal of the stored cooking sequence to the oven controller by swiping the bar-coded card through the reader.

* * * * *